United States Patent [19]

Hyuga

[11] Patent Number: 5,502,738
[45] Date of Patent: Mar. 26, 1996

[54] POLARIZATION CONTROL ELEMENT AND SOLID-STATE LASER SYSTEM

[75] Inventor: Hiroaki Hyuga, Kanagawa, Japan

[73] Assignee: Fuji Photo Film Co., Ltd., Kanagawa, Japan

[21] Appl. No.: 127,374

[22] Filed: Sep. 28, 1993

[30] Foreign Application Priority Data

Oct. 16, 1992 [JP] Japan .................................. 4-278709

[51] Int. Cl.$^6$ ........................................................ H01S 3/10
[52] U.S. Cl. ................... 372/21; 372/27; 372/105; 372/92
[58] Field of Search .............................. 372/22, 27, 21, 372/71, 66, 92; 385/16, 105

[56] References Cited

U.S. PATENT DOCUMENTS

| | | | |
|---|---|---|---|
| 4,642,809 | 2/1987 | Petheram | 372/71 |
| 4,739,507 | 4/1988 | Byer et al. | 372/22 |
| 5,020,073 | 5/1991 | Alfrey et al. | 372/27 |
| 5,038,360 | 8/1991 | Negus et al. | 372/105 |
| 5,175,741 | 12/1992 | Okazaki | 372/21 |
| 5,243,611 | 9/1993 | Hyuga et al. | 372/22 |
| 5,315,433 | 5/1994 | Okazaki et al. | 372/21 |

FOREIGN PATENT DOCUMENTS 62-189783  8/1987  Japan .

Primary Examiner—Leon Scott, Jr.
Attorney, Agent, or Firm—Sughrue, Mion, Zinn, Macpeak & Seas

[57]  ABSTRACT

A solid-state laser system capable of generating a linearly polarized laser beam and achieving a high oscillation efficiency by suppressing an insertion loss to a minimum. A polarization control element is made of an angularly cut crystal having a birefringence, and the thickness and reflectivities of the end surfaces of the element are adjusted so that the control element can act as a Fabry-Perot etalon. This polarization control element is interposed between an end surface of an Nd:YAG crystal which acts as a solid-state laser medium and a resonator mirror.

19 Claims, 2 Drawing Sheets

POLARIZATION CONTROL ELEMENT AND SOLID-STATE LASER SYSTEM

BACKGROUND OF THE INVENTION

1. Field of the Invention

This invention relates to a polarization control element for obtaining a linearly polarized laser beam.

This invention also relates to a solid-state laser system which has a cavity resonator provided with the polarization control element, and produces a linearly polarized laser beam.

2. Description of the Prior Art

Solid-state laser systems are widely known in which a solid-state laser crystal added with rare earth materials such as neodymium is pumped by a semiconductor laser, or the like, as disclosed, for example, in Japanese Unexamined Patent Publication No. 62(1987)-189783. In this type of a solid-state laser system, it is widely practiced to put crystal made of a non-linear optical material in the cavity resonator so that the wavelength of a solid-state laser beam can be converted into, for example, a second harmonic wave in order to obtain a laser beam having a shorter wavelength.

By the way, as with other types of laser systems, there is a need for the generation of a linearly polarized laser beam and a linearly polarized laser beam in a single longitudinal mode. However, when an optically isotropic crystal such as a YAG crystal is used as a solid-state laser medium, the crystal in its present form cannot produce a linear polarized laser beam. In such a case, various techniques have been hitherto employed: for example, a Brewster plate for polarization control purposes is incorporated into a cavity resonator in order to obtain a linearly polarized laser beam; or a Brewster plate and an etalon are incorporated in a cavity resonator in order to obtain a linearly polarized laser beam in a single longitudinal mode.

However, it is admittedly reported that the Brewster plate causes a large insertion loss because of an imperfection with a profile irregularity of an optically polished plane of the Brewster plate; a very small difference between an optically polished plane of the Brewster plate and the Brewster angle; and surface or internal scattering of the Brewster plate. An etalon also brings about an insertion loss not as great as the Brewster plate due to its surface and internal scattering. The insertion loss induces a drop in an oscillation efficiency of a solid-state laser system.

Moreover, when the Brewster plate and the etalon are incorporated into the cavity resonator, the parts and adjustment of these two optical elements are expensive, which, in turn, adds to the cost of a solid-state laser system.

SUMMARY OF THE INVENTION

In view of the foregoing observations and descriptions, the principle object of this invention is to provide a polarization control element which is capable of linearly polarizing a solid-state laser beam and suppressing an insertion loss to a minimum.

Another object of this invention is to provide a polarization control element which linearly polarizes a solid-state laser beam, and then puts the linearly polarized laser beam in a single longitudinal mode; and which is capable of reducing an insertion loss to a minimum.

Still another object of this invention is to provide a solid-state laser system which is capable of producing a linearly polarized laser beam, and provides a high oscillation efficiency by suppressing an insertion loss to a minimum.

Further object of this invention is to provide an inexpensive solid-state laser system which is capable of producing a linearly polarized laser beam in a single longitudinal mode, and provides a high oscillation efficiency by suppressing an insertion loss.

To these ends, according to a first aspect of this invention, the present invention provides a first polarization control element made of a crystal possessing a birefringence with the incidence and exit end faces thereof angularly cut to produce an angle with respect to the principle axis of the crystal.

According to a second aspect of this invention, the present invention provides a second polarization control element made of the foregoing crystal having the birefringence and the angular cuts while the thickness and reflectivities of the end faces of the element is adjusted so that the element can act as a Fabry-Perot etalon.

According to a third aspect of this invention, the present invention provides a third polarization control element including either the first or second polarization control element which is made of a non-linear optical material, and has functions of wavelength conversion.

According to a fourth aspect of this invention, the present invention provides a first solid-state laser system having a cavity resonator which incorporates the first polarization control element.

According to a fifth aspect of this invention, the present invention provides a second solid-state laser system having a cavity resonator which incorporates the second polarization control element.

According to a sixth aspect of this invention, the present invention provides a third solid-state laser system having a cavity resonator which incorporates the third polarization control element.

When a laser beam enters one of the first, second and third polarization control elements, each having angular cuts, the beam is split into an ordinary ray and an extraordinary ray. In one of the first, second and third laser beam systems, each having the cavity resonator which incorporates the polarization control, element, either one of these two rays is selected, and then the selected ray is oscillated in accordance with the position of a resonator mirror, whereby an outgoing laser beam from the resonator is linearly polarized.

In the second solid-state laser system using the second element as the polarization control element, this element which also acts as an etalon selects an oscillation wavelength, so that an outgoing laser beam from the resonator enters a single longitudinal mode.

As mentioned above, since the polarization control element having the birefringence and angular cuts brings about a smaller loss when compared with the aforementioned Brewster plate, a solid-state laser system equipped with this polarization control element will be superior in oscillation efficiency.

Especially, since the second polarization control element also acts as an etalon, when compared with an existing combination of a Brewster plate and an etalon, an insertion loss is significantly reduced, and the cost of parts and adjustment is also reduced. Hence, the second solid-state laser system equipped with the second polarization control element becomes particularly superior in oscillation efficiency when compared with an existing system for producing a linearly polarized laser beam in a single longitudinal mode, and also can be fabricated at low cost.

In addition to the functions of the first and second polarization control elements, the third polarization control element has a function of optical wavelength conversion, and hence it brings about a smaller insertion loss, and reduces the cost of parts and adjustment to a significantly lesser extent in comparison with the combination of a Brewster plate and an optical wavelength converter element or the combination of a Brewster plate, an etalon and an optical wavelength converter element. Accordingly, the third solid-state laser system equipped with this third polarization control element is particularly superior in oscillation efficiency, and also can be fabricated at a remarkably low cost.

In particular, when the third polarization control element possesses a function of an etalon, a solid-state laser beam which acts as a fundamental wave enters a significantly high power density state by multiple reflections within this element, and hence the wavelength conversion efficiency of the element is considerably increased.

DESCRIPTION OF THE PREFERRED EMBODIMENTS

Referring to the embodiments shown in the accompanying drawings, the present invention will now be described in detail.

Figure 1:
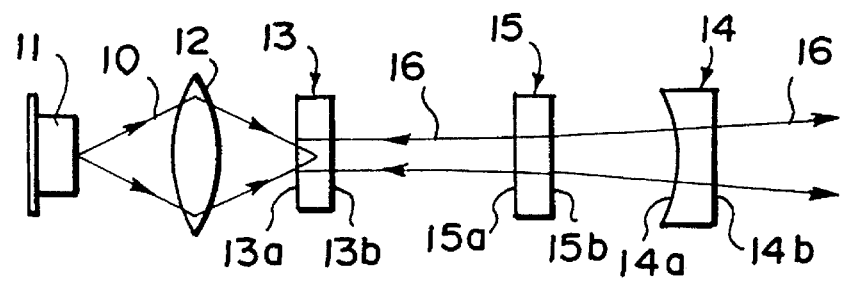
FIG. 1 is a side elevation view showing a solid-state laser system according to a first embodiment of this invention.

First Embodiment:

FIG. 1 illustrates a laser-diode-pumped solid-state laser according to a first embodiment of this invention. This laser-diode-pumped solid-state laser is made up of a semiconductor laser (a phase-coupled array laser) 11 for emitting a laser beam 10 as a pumping beam; a condenser lens 12 for focusing the laser beam 10 which is a divergent beam; a YAG crystal (hereinafter referred to as an Nd:YAG crystal), doped with neodymium (Nd), which is a solid-state laser medium; a resonator mirror 14 disposed forwardly (on the right side of the drawing) of the Nd:YAG crystal 13; and a polarization control element 15 interposed between the resonator mirror 14 and the Nd:YAG crystal 13. These elements are mounted in a non-illustrated housing in the form of a single unit. The phased array laser 11 is kept at a given temperature by means of non-illustrated Peltier element and temperature regulating circuit.

A laser having an output power of 400 mW for emitting a laser beam 10 having a wavelength of 809 nm is used as the phased array laser 11. The Nd:YAG crystal 13 has an Nd concentration of 1 atm % and a thickness of 1 mm. The incidence of the laser beam 10 upon the Nd:YAG crystal 13 causes neodymium atoms to be excited, and hence the crystal emits a laser beam 16 having a wavelength of 946 nm. A mirror surface 14a of the resonator mirror 14 has a curvature radius of 20 mm. The polarization control element 15 is made of a crystal of calcite which possesses a birefringence, and cut into a thickness of 0.8 mm while the element is held with both its end faces 15a and 15b angularly cut to produce an angle of 45 degrees with respect to the principle axis of the element as illustrated in detail in FIG. 2.

The reflectivities or transmissivities of: both end faces 13a and 13b of the Nd:YAG crystal 13; the mirror surface 14a and light exit end face 14b of the resonator mirror 14; and both faces 15a and 15b of the polarization control element 15 with respect to the foregoing wavelengths and other oscillation lines of the Nd:YAG crystal 13 at wavelengths of 1064 nm and 1300 nm, are adjusted as shown in the following table by suitably coating these faces. In this table, R represents a reflectivity, and T represents a transmissivity. The numerical values in the table are percentages.

|         | 13a      | 13b       | 14a     | 14b       | 15a    | 15b    |
|---------|----------|-----------|---------|-----------|--------|--------|
| 809 nm  | T ≧ 85   | R ≦ 2     | —       | —         | —      | —      |
| 946 nm  | R ≧ 99.9 | R ≦ 0.1   | R ≧ 98  | R ≦ 0.2   | R = 10 | R = 10 |
| 1064 nm | T ≧ 30   | R ≦ 10    | T ≧ 30  | R ≦ 10    | —      | —      |
| 1300 nm | T ≧ 70   | R ≦ 25    | T ≧ 70  | R ≦ 25    | —      | —      |

With the above arrangement, a standing wave having a wavelength of 946 nm arises between both end faces 15a and 15b of the polarization control element 15. Only the laser beam 16 at this wavelength of 946 nm cause intense oscillation between the end face 13a of the Nd:YAG crystal and the mirror surface 14a, and a part of this laser beam emerges from the light exit end face 14b of the cavity resonator 14. Thus, in this embodiment, although the polarization control element 15 is made to act also as a Fabry-Perot etalon by coating both its end faces 15a and 15b, a similar function can be achieved without the use of such a coating by utilizing Fresnel reflections inherent to a crystal which constitutes the polarization control element 15. In this embodiment, a distance between the end face of the Nd:YAG crystal 13 and the mirror surface 14a, i.e. a cavity length is set to 10 mm.

Figure 2:
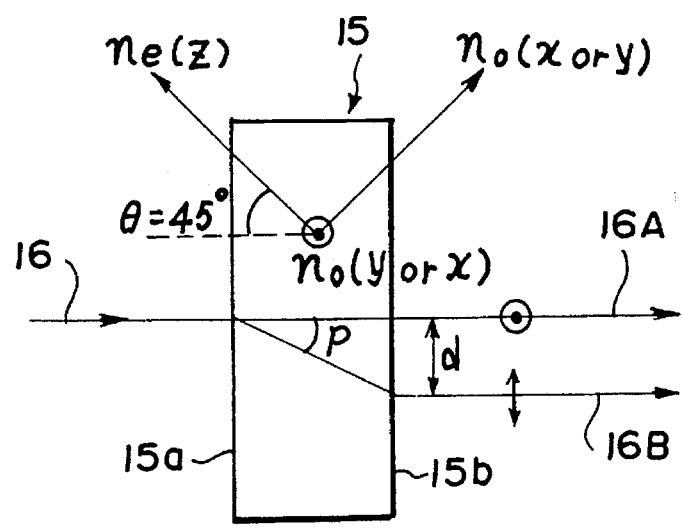
FIG. 2 is a side elevation view showing the details of a polarization control element of the laser system shown in FIG. 1.

The laser beam 16 having a wavelength of 946 nm which emerges from the optically isotropic Nd:YAG crystal 13 is split into an ordinary ray 16A and an extraordinary ray 16B by means of the polarization control element 15 which possesses a birefringence as shown in FIG. 2. Only one of the ordinary ray 16A and the extraordinary ray 16B is oscillated by positioning the resonator mirror 14 with an adequate adjustment in a direction of split of the ordinary ray 16A and the extraordinary ray 16B. Thereby, the laser beam 16 emerging from the resonator mirror 14 is linearly polarized. In this embodiment, a separation pitch "d" between the ordinary ray 16A and the extraordinary ray 16B is 80 micrometers.

In this embodiment, it was confirmed that the laser beam 16 having a wavelength of 946 nm which emerges from the resonator mirror 14 is in a single longitudinal mode, and its output power is 10 mW. The output of this laser beam is about 1.5 times as large as an output produced by a conventional arrangement using the combination of a Brewster plate and an etalon instead of the polarization control element 15.

Assume that an angle between the principle axis of a crystal having a birefringence and an incident ray is θ, an angle between an ordinary ray and an extraordinary ray is ρ, and a reflectivity of the crystal with respect to the ordinary ray and the extraordinary ray is $n_o$ and $n_e$, respectively. Then, the following relationship is obtained.

|        | 13a      | 13b      | 14a      | 14b       | 15a      | 15b      |
|--------|----------|----------|----------|-----------|----------|----------|
| 809 nm | T ≧ 85   | R ≦ 2    | —        | —         | —        | —        |
| 946 nm | R ≧ 99.9 | R ≦ 0.1  | R ≧ 99.9 | R ≦ 0.2   | R = 10   | R = 10   |
| 1064 nm| T ≧ 30   | R ≦ 10   | T ≧ 30   | R ≦ 10    | —        | —        |
| 1300 nm| T ≧ 70   | R ≦ 25   | T ≧ 70   | R ≦ 25    | —        | —        |
| 73 nm  | R ≧ 98   | R ≦ 10   | T ≧ 93   | R ≦ 0.3   | R ≦ 1    | R ≦ 1    |

$$\rho = \theta - \tan^{-1}\left(\frac{n_o^2}{n_e^2}\tan\theta\right) \quad \text{equation 1}$$

Hence, the separation pitch "d" between the ordinary ray and the extraordinary ray when the crystal has a thickness "t" is obtained by $$d = t \times \tan\rho = t\frac{(n_e^2 - n_o^2)\tan\theta}{n_e^2 + n_o^2 \tan^2\theta} \quad \text{equation 2}$$

It is desirable for a separation pitch "d" to be greater, and a maximum value of the separation pitch is obtained as below when $\tan\theta = n_e/n_o$.

$$d = t\frac{n_e^2 - n_o^2}{2n_e n_o} \quad \text{equation 3}$$

Therefore, when $\theta = \tan^{-1}(n_e/n_o)$, a most desirable separation pitch "d" is obtained. However, the separation pitch is not limited to this. Provided that the radius ($1/e^2$) of the solid-state-laser-oscillated beam is "w", excellent results will be obtained when $d \geq 0.5$ w.

Although the foregoing descriptions are given with respect to the oscillation at a wavelength of 946 nm, other oscillation lines of the Nd:YAG crystal 13 are possible. For instance, oscillation lines may be put into a single longitudinal mode, and subjected to a polarization control in the same manner as the oscillation at a wavelength of 946 nm.

Figure 3:
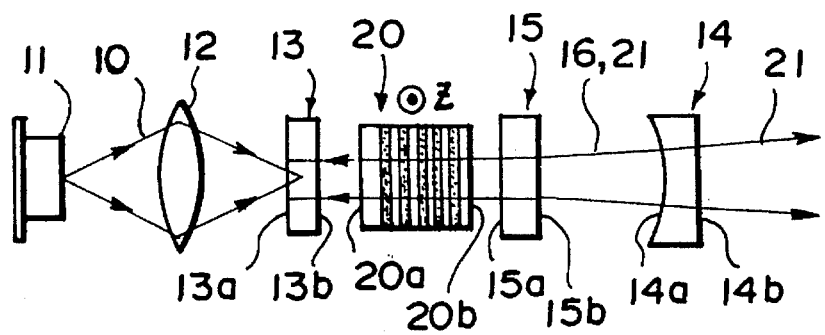
FIG. 3 is a side elevation view showing a solid-state laser system according to a second embodiment of this invention.

Second Embodiment:

Referring to FIG. 3, a second embodiment of this invention will now be described. In this drawing, the same reference numerals are provided to designate corresponding features in FIG. 1, and explanation thereof will be omitted here for clarity. The same rule applies correspondingly to the following. Unless otherwise specified, the specifications of the cavity resonator remain the same as the first embodiment.

A laser-diode-pumped solid-state laser according to the second embodiment is basically different from the laser system of the first embodiment in that an optical wavelength converting element 20 is incorporated into the cavity resonator. A bulk crystal (with a crystal length of 3 mm), made of LiNbO₃, with periodic domain reversals is given as one example of such an optical wavelength converting element 20. In such an arrangement, a linearly polarized laser beam 16 having a wavelength of 946 nm in a single longitudinal mode is obtained by the action of the polarization control element 15. This laser beam 16 is then converted into a second harmonic wave 21 having a half wavelength, i.e., a wavelength of 473 nm.

Reflectivities or transmissivities of: both end faces 13a and 13b of the Nd:YAG crystal 13; the mirror surface 14a and light exit end face 14b of the resonator mirror 14; and both end faces 15a and 15b of the polarization control element 15 with respect to each wavelength, are adjusted as shown in the following table by suitably coating these faces. In this table, R represents a reflectivity, and T represents a transmissivity. The numerical values in the table are percentages.

Reflectivities of both end surfaces of 20a and 20b of the optical wavelength converting element 20 are as follows:

|         | 20a    | 20b    |
|---------|--------|--------|
| 946 nm  | R ≦ 1  | R ≦ 1  |
| 473 nm  | R ≦ 1  | R ≦ 1  |

In the above arrangement, the laser beam 16 at a wavelength of 946 nm barely passes through the mirror surface 14a of the resonator mirror 14 at all, whilst a part of the second harmonic wave 21 at a wavelength of 473 nm passes through the mirror surface 14a, and then exits from a light exit end surface 14b. This second harmonic wave 21 is in a single longitudinal mode, and its output is 6 mW. The output of this second harmonic wave is about twice as large as that produced by the conventional arrangement of the Brewster plate and etalon in combination instead of the polarization control element 15.

In the above arrangement, when a non-linear optical constant $d_{33}$ of the optical wavelength converting element 20, with domain reversal structures, which is made of an LiNbO₃ crystal is utilized, the direction of the linear polarization of the laser beam 16 at a wavelength of 946 nm which acts as a fundamental wave must be brought into line with the direction of the z-axis of the LiNbO₃ crystal. For this purpose, when the optical wavelength converting element 20 and the polarization control element 15 are arranged as shown in FIG. 3, the position of the resonator mirror 14 is adjusted so that an ordinary ray can cause oscillation.

Figure 4:
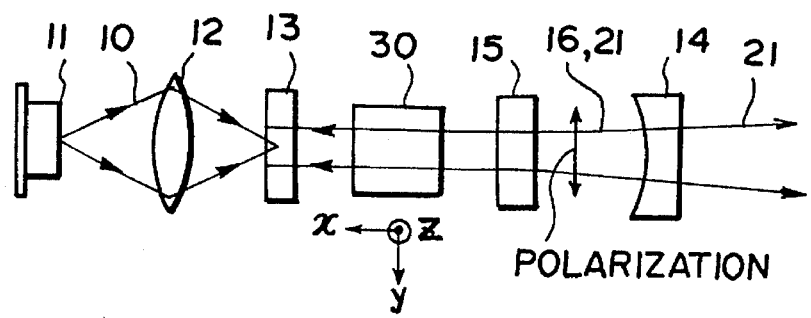
FIG. 4 is a side elevation view showing a solid-state laser system according to a third embodiment of this invention.

Third Embodiment:

With reference to FIG. 4, a third embodiment of this invention will now be described. A system according to this third embodiment is also a laser-diode-pumped solid-state laser, and an optical wavelength converting element 30 made of a KNbO₃ crystal is used instead of the optical wavelength converting element 20 made of LiNbO₃ crystal employed in the system shown in FIG. 3. This optical wavelength converting element 30 is regulated at a temperature of 180 degrees Centigrade by means of a non-illustrated temperature control means. The laser beam 16 which acts as a fundamental wave is phase-matched with the second harmonic wave 21 by a NCPM (non-critical phase matching) method which utilizes a non-linear optical constant $d_{32}$ of the optical wavelength converting element. In this case, the direction of the linear polarization of the laser beam 16 is brought into line with the direction of the y-axis of the KNbO₃ crystal 30.

Even in this arrangement, a linearly polarized laser beam 16 at a wavelength of 946 nm in a single longitudinal mode is obtained by the action of the polarization control element 15. This laser beam 16 is then converted into a second harmonic wave 21 having a half wavelength, that is, a wavelength of 473 nm by means of the optical wavelength converting element 30.

Still more, when the direction of the linear polarization of the laser beam 10 emitted from the semiconductor laser 11 is brought into line with the direction of the linear polarization of the solid-state laser beam 16, an oscillation efficiency of the solid-state laser becomes about 1.2–1.5 times as large as that obtained when these two directions of the linear polarization cross each other at right angles.

Figure 5:
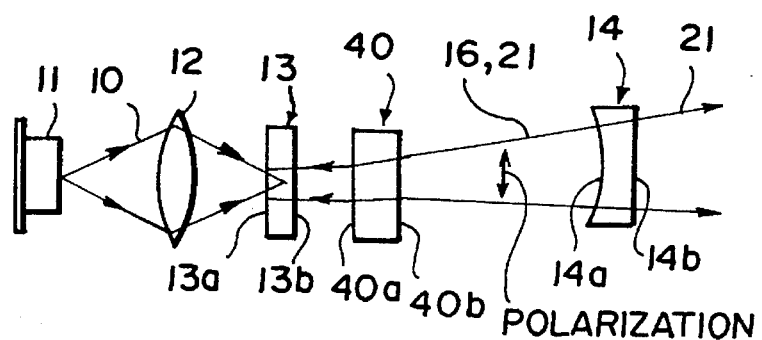
FIG. 5 is a side elevation view showing a solid-state laser system according to a fourth embodiment of this invention.

Fourth Embodiment:

With reference to FIG. 5, a fourth embodiment of the present invention will now be described. A system according to this invention is also a laser-diode-pumped solid-state laser. In this embodiment, a polarization control element 40, with periodic domain reversals, which is made of a bulk crystal (having a thickness of 0.8 mm) of LiNbO$_3$ is used instead of the polarization control element 15, made of calcite, which is employed in the system shown in FIG. 1.

Figure 6:
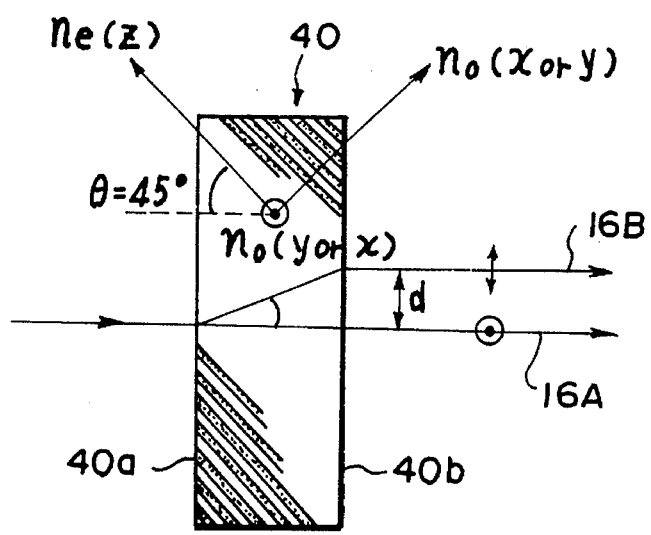
FIG. 6 is a side elevation view showing the details of a polarization control element of the laser system shown in FIG. 5.

The polarization control element 4 made of a bulk crystal of LiNbO$_3$ possesses a birefringence, and shows a non-linear optical effect. As shown in detail in FIG. 6, the crystal is cut to a thickness of 0.8 mm while both end faces 40a and 40b thereof are kept at an angle of 45 degrees with respect to the principle axis of the crystal as shown in detail in FIG. 6. The periodic domain reversals are arranged in the direction of the x-axis or the y-axis of the crystal at a pitch of $\Lambda=3$ micrometers. The polarization control element 40 made of the bulk crystal of LiNbO$_3$ has: a reflectivity $n_0=2.24$ for the ordinary ray 16A; a reflectivity $n_e=2.16$ for the extraordinary ray 16B; an angle $\rho=36$ m rad between the ordinary ray 16A and the extraordinary ray 16B; and a separation pitch "d"=30 micrometers between the ordinary ray 16A and the extraordinary ray 16B. The position of the resonator mirror 14 is adjusted so that only the extraordinary ray 16B can cause oscillation.

Reflectivities or transmissivities of: both end faces 13a and 13b of the Nd:YAG crystal 13; the mirror surface 14a and light exit end face 14b of the resonator mirror 14; and both end faces 40a and 40b of the polarization control element 40 with respect to each wavelength, are adjusted as shown in the following table by suitably coating these faces. In this table, R represents a reflectivity, and T represents a transmissivity. The numerical values in the table are percentages.

|         | 13a      | 13b      | 14a      | 14b       | 40a      | 40b      |
|---------|----------|----------|----------|-----------|----------|----------|
| 809 nm  | T ≥ 85   | R ≤ 2    | —        | —         | —        | —        |
| 946 nm  | R ≥ 99.9 | R ≤ 0.1  | R ≥ 99.9 | R ≤ 0.2   | R = 10   | R = 10   |
| 1064 nm | T ≥ 30   | R ≤ 10   | T ≥ 30   | R ≤ 10    | —        | —        |
| 1300 nm | T ≥ 70   | R ≤ 25   | T ≥ 70   | R ≤ 25    | —        | —        |
| 473 nm  | R ≥ 98   | R ≤ 10   | T ≥ 93   | R ≤ 0.3   | R ≤ 1    | R ≤ 1    |

With the above arrangement, a linearly polarized laser beam 16 at a wavelength of 946 nm in a single longitudinal mode is obtained by the action of the polarization control element 40. This laser beam 16 is then converted into a second harmonic wave 21 having a half wavelength, i.e., a wavelength of 473 nm. As a matter of course, this second harmonic wave 21 is in a single longitudinal mode, and its output is 10 mW.

In addition to calcite and LiNbO$_3$ used in the foregoing embodiments, rutile, quartz, YVO$_4$ or others may be used as a material for constituting the polarization control element of the present invention. Particularly, KTiOPO$_4$ (KTP), KNbO$_3$ and LiTaO$_3$ or others may be used as a material which exhibits a non-linear optical effect.

Although all the polarization control elements in the foregoing embodiments also act as an etalon, an insertion loss is reduced unless the polarization control element possesses such a function when compared with a case where the previously mentioned Brewster plate is used for polarization control, whereby the oscillation efficiency of a solid-state laser system can be improved. For instance, in the arrangement shown in FIG. 3, when a polarization control element which is cut to a thickness of 2 mm and similarly made of calcite crystal is used instead of the polarization control element 15 having a thickness of 0.8 mm, an output of the second harmonic wave 21 in a multiple longitudinal mode is 8 mW.

In contrast to this, in the arrangement shown in FIG. 3, when the Brewster plate is used instead of the polarization control element 15, an output of the second harmonic wave 21 in a multiple longitudinal mode becomes 5 mW. In this case, it can be said that the oscillation efficiency of the solid-state laser system is improved by 1.6 times by virtue of the polarization control element of this invention.

It will be understood that the above description of the present invention is subjected to various modifications, changes and adaptations and the same are intended to be comprehended within the meaning and range of equivalents of the appended claims.

What is claimed is:

1. A polarization control element comprising a crystal possessing a birefringence with incidence and exit end faces thereof angularly cut to produce an angle with respect to a principle axis of the crystal;

wherein the thicknesses and reflectivities of said end faces of said polarization control element are adjusted so that said polarization element acts as a Fabry-Perot etalon thereby producing a linearly polarized beam in a single longitudinal mode.

2. A polarization control element as defined in claim 1, wherein said polarization control element is composed of a non-linear optical material.

3. A solid state laser system comprising:

a source of laser light;

a cavity resonator;

a polarization control element incorporated in said cavity resonator having a crystal possessing a birefringence with incidence and exit faces thereof angularly cut to produce an angle with respect to a principle axis of the crystal, wherein thicknesses and reflectivities of said end faces of said polarization control element are selected so that said element acts as a Fabry-Perot etalon, and wherein said polarization control element is composed of non-linear optical material.

4. A solid state laser system according to claim 3 further comprising a wavelength converter element within said resonator.

5. A solid state laser system, comprising:

a source of light;

a cavity resonator;

a polarization control element incorporated in said cavity resonator, said control element having a crystal possessing a birefringence with incidence and exit faces thereof angularly cut to produce an angle with respect to a principle axis of the crystal, wherein said polarization control element causes a beam incident on said incidence face to split into an ordinary ray and an extraordinary ray; and a resonating mirror positioned in a path of one of said ordinary and extraordinary rays, causing one of said ordinary and extraordinary rays to oscillate between said crystal and said resonating mirror and to emerge from said resonating mirror as a linearly polarized beam.

6. A solid state laser system according to claim 5 wherein a separation of said ordinary and extraordinary rays is determined by selecting a thickness of said crystal.

7. A solid state laser system according to claim 6, in which said cavity resonator further comprises an optical wavelength converting element for converting said one of said ordinary and extraordinary rays which has been caused to oscillate into a second harmonic wave.

8. A solid state laser system according to claim 6, wherein the reflectivities of both end faces of said polarization control element are adjusted so that said element acts as a Fabry-Perot etalon.

9. A solid state laser system according to claim 8 further comprising a wavelength converter element within said resonator.

10. A solid state laser system according to claim 9, wherein said polarization control element comprises calcite.

11. A solid state laser system according to claim 10, wherein said wavelength converter element comprises a wavelength-converting crystal which has a periodic domain reversal structure.

12. A solid state laser system according to claim 8, wherein said polarization control element comprises calcite.

13. A solid state laser system as defined in claim 6, wherein said polarization control element is composed of a non-linear optical material.

14. A solid state laser system according to claim 6, wherein said polarization control element comprises calcite.

15. A solid state laser system according to claim 5, in which said cavity resonator further comprises an optical wavelength converting element for converting said one of said ordinary and extraordinary rays which has been caused to oscillate into a second harmonic wave.

16. A solid state laser system according to claim 15, in which said wavelength converting element is a bulk crystal with periodic domain reversals.

17. A solid state laser system according to claim 15, in which said optical wavelength converting element phase-matches said one of said ordinary and extraordinary rays which has been caused to oscillate with said second harmonic wave.

18. A solid state laser system as defined in claim 5, wherein said polarization control element is composed of a non-linear optical material.

19. A solid state laser system according to claim 5, wherein said polarization control element comprises calcite.

* * * * *